(12) United States Patent
Cotter

(10) Patent No.: US 6,516,696 B2
(45) Date of Patent: *Feb. 11, 2003

(54) SLEEVE-TYPE GAS SPRING

(75) Inventor: Jonathan P. Cotter, Dearborn, MI (US)

(73) Assignee: Diebolt International, Inc., Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,767

(22) Filed: Feb. 3, 1998

(65) Prior Publication Data

US 2001/0002076 A1 May 31, 2001

(51) Int. Cl.$^7$ .............................. B26F 1/02; F16F 9/02; F16F 9/43
(52) U.S. Cl. ............................... 83/588; 83/146; 83/684; 267/64.28; 267/119
(58) Field of Search .......................... 83/136, 137, 138, 83/139, 140, 145, 146, 552, 588, 590, 684, 686, 698.91; 267/113, 118, 119, 130, 64.28

(56) References Cited

U.S. PATENT DOCUMENTS

| 4,550,899 A | | 11/1985 | Holley | 267/119 |
| 4,631,996 A | * | 12/1986 | Magnuson | 83/137 X |
| 4,742,997 A | * | 5/1988 | Wallis | 267/64.28 X |
| 5,088,698 A | | 2/1992 | Wallis | 267/119 |
| 5,172,892 A | * | 12/1992 | Wallis | 267/64.28 X |
| 5,314,172 A | * | 5/1994 | Wallis | 267/119 |
| 5,318,281 A | * | 6/1994 | Wallis | 267/64.28 X |
| 5,344,125 A | * | 9/1994 | Cotter | 267/64.28 |
| 5,452,883 A | | 9/1995 | Holson et al. | 267/64.28 |
| 5,553,524 A | * | 9/1996 | Fujita | 83/137 |
| 5,813,301 A | * | 9/1998 | Fujita | 83/140 |

FOREIGN PATENT DOCUMENTS

DE 1902323 3/1971

* cited by examiner

Primary Examiner—Clark F. Dexter
(74) Attorney, Agent, or Firm—Reising, Ethington, Barnes, Kisselle, Learman & McCulloch, P.C.

(57) ABSTRACT

A sleeve-type gas spring for a turret indexing press has an annular piston operably associated with a punch tool to reciprocate therewith and defining in part an annular gas chamber constructed to receive a gas under pressure. As the punch tool and piston are driven to their extended position by a press ram or some such other power device, the volume of the gas chamber decreases thereby increasing the pressure within the gas chamber such that when the ram is retracted, the pressure of the gas acting on the piston displaces the piston and the punch tool to their retracted positions. The force acting to retract the piston and the punch is dependent on the initial pressure of the gas within the gas chamber and the change in volume of the gas chamber as the punch tool and piston are extended. Thus, the retracting force of the sleeve-type gas spring can be readily changed by varying the initial pressure of gas within the gas chamber to provide a spring which is versatile and which may be used with a plurality of different presses or in a plurality of different applications wherein varying retraction forces may be needed. Further, the sleeve-type gas spring has a very long life in service and can be easily recharged and any worn seals easily replaced to facilitate servicing the gas spring.

18 Claims, 2 Drawing Sheets

SLEEVE-TYPE GAS SPRING

FIELD OF THE INVENTION

This invention relates generally to gas springs and more particularly to a sleeve type gas spring defining an annular gas pressure chamber.

BACKGROUND OF THE INVENTION

Punch assemblies typically used in turret indexing presses have utilized a mechanical spring, such as a coil or belleville spring, to retract the punch after it has been driven or advanced by a mechanically or hydraulically actuated ram or some such other device. The mechanical spring used to retract the punch is subject to fatigue and wear in use and may break or otherwise fail in use and has a fixed spring rate or force which will retract the punch. Further, if a high force is desired to more rapidly or forcefully retract the punch, a larger mechanical spring is generally required which is undesirable in view of the compact configuration of the turret indexing press.

SUMMARY OF THE INVENTION

A sleeve-type gas spring for a turret indexing press has an annular piston operably associated with a punch tool to reciprocate therewith and defining in part an annular gas chamber constructed to receive a gas under pressure. As the punch tool and piston are driven to their extended position by a press ram or some other such power device, the volume of the gas chamber decreases thereby increasing the pressure within the gas chamber such that when the press ram is retracted, the pressure of the gas acting on the piston returns the piston and the punch tool to their retracted positions. The force acting to retract the piston and the punch is dependent on the pressure of the gas within the gas chamber and the change in volume of the gas chamber as the punch tool and piston are extended. Thus, the retracting force of the sleeve-type gas spring can be readily changed by varying the pressure of gas within the gas chamber to provide a spring which is versatile and which may be used with a plurality of different punch tools or in a plurality of different applications wherein varying retraction forces may be needed. Further, the sleeve-type gas spring has a very long life in service, can be easily recharged, and any worn seals easily replaced to facilitate servicing the gas spring.

Objects, features and advantages of this invention include providing a sleeve-type gas spring for use in a punch assembly such as a turret indexing press which can provide a force which is readily changeable to retract a punch or other work tool of the press, utilizes a readily available and inexpensive gas such as nitrogen to provide the force to retract the punch, can provide a relatively high force to retract the punch in a compact package, is of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
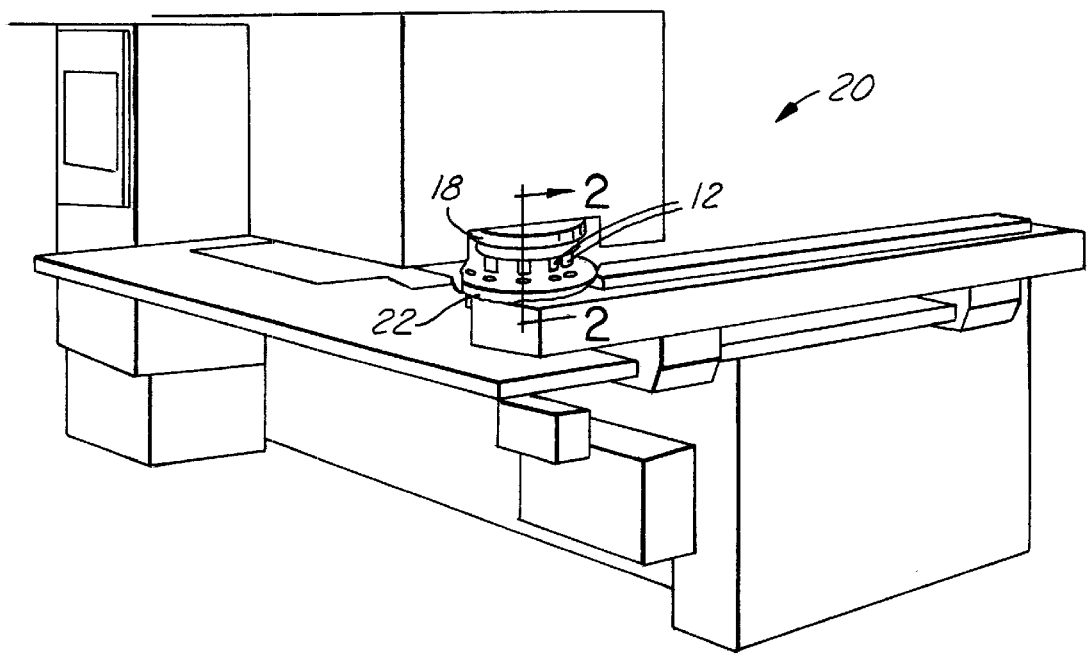
FIG. 1 is a perspective view of a turret indexing punch press with a gas spring embodying the present invention received in a turret of the press.
Figure 2:
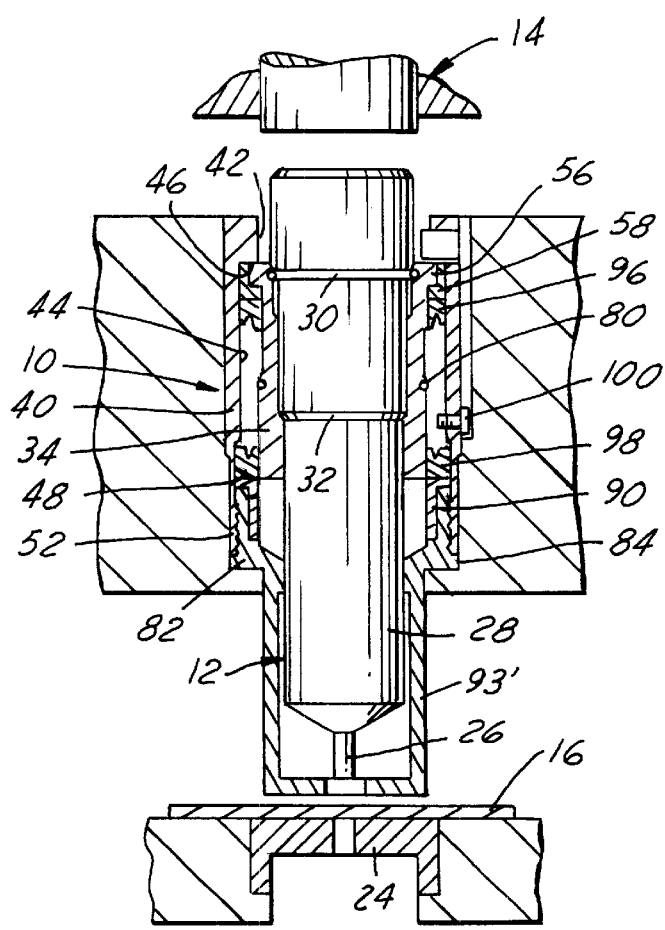
FIG. 2 is a cross sectional view of a punch tool mounted in the gas spring which is mounted in the turret of the press.

Referring in more detail to the drawings, FIGS. 1 and 2 illustrate a sleeve-type gas spring 10 used to retract a punch tool 12 driven by a hydraulically actuated ram 14 or some such other device to form a workpiece 16. As shown, the separate sleeve-type gas spring 10 is used to retract each of a plurality of punch tools 12 received in an indexing turret 18 of the punch press 20. The press 20 has an upper turret 18 with a plurality of punch tools 12 and a lower complimentary turret 22 carrying a complimentary female die 24 into which the punch tool 12 passes when extended by the ram 14 to punch a hole through the workpiece 16 disposed between the punch tool 12 and the female die 24. As shown, the punch tool 12 has a tip 26 constructed to engage the workpiece 16 and a shank 28 received through the sleeve-type gas spring 10 and extending above the body of the upper turret 18 so that it may be advanced or extended by the hydraulic ram 14. The punch tool 12 has annular shoulders 30, 32 which bear on a piston 34 of the gas spring 10 to drive the piston 34 as the punch tool 12 is advanced by the ram 14.

Figure 3:
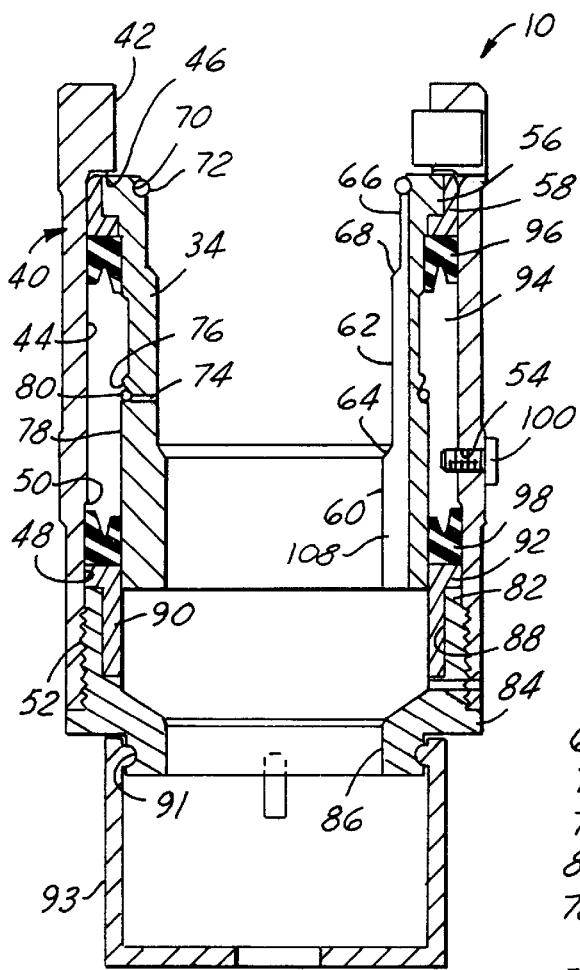
FIG. 3 is a cross sectional view of the sleeve-type gas spring.
Figure 5:
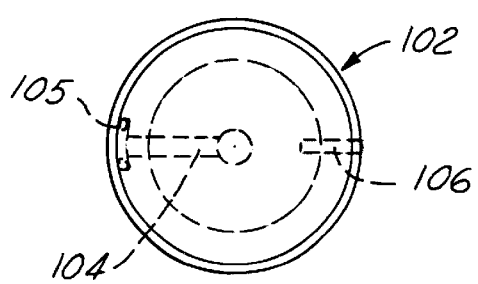
FIG. 5 is an end view of the filler mandrel of FIG. 4.

As shown in FIGS. 2 and 3, the sleeve-type gas spring 10 has a cylindrical, annular body 40 with a through bore 42, a first counterbore 44 providing a stop shoulder 46 and a second counterbore 48 providing a second shoulder 50. The body 40 has interior threads 52 at one end and a small hole 54 therethrough.

The piston 34 is an annular sleeve, slidably received for reciprocation within the body 40 and has a radially extending flange 56 which engages the stop shoulder 46 of the body 40 to limit the travel of the piston 34. An annular bearing 58 carried by the piston 34 and surrounding the flange 56 guides the piston 34 for reciprocation within the body 40. The piston 34 has a through bore 60 constructed to receive the punch tool shank 28, a first counterbore 62 providing an annular shoulder 64 and a second counterbore 66 providing another annular shoulder 68. A groove 70 formed in the inner surface of the piston 34 receives an O-ring 72 which provides a dust seal. A gas fill passage 74 through the piston 34 communicates the interior of the piston 34 with its exterior. A groove 76 formed in the piston's outer surface 78 into which the gas fill passage 74 opens is constructed to receive an O-ring 80 which controls gas flow through the gas fill passage 74.

The threaded lower portion 52 of the body threadedly receives an end cap 82 having a shoulder 84 which bears on the body 40. As shown in FIG. 3, the end cap 82 has a through bore 86 through which the punch tool 12 is received and a counterbore 88 constructed to receive an annular bearing 90 to guide the piston 34 as it reciprocates with the punch tool 12. Preferably the bearing has a radially outwardly extending flange 92 which overlies and abuts the punch tool guide 82 to provide a seat for a seal. An external groove 91 (FIG. 3) formed in the end cap 82 is constructed to receive a complimentary projection of a punch stripper 93 constructed to remove any scrap material from the tip 26 of the punch tool 12 as the tool 12 is retracted from the workpiece 16. Alternatively, as shown in FIG. 2, a punch stripper 93' may be integrally formed with the end cap 82.

An annular gas chamber 94 constructed to receive a gas under pressure, such as nitrogen, is defined between the piston 34, the body 40 and a pair of spaced apart annular sealing members 96, 98 each providing a seal between the piston 34 and the body 40 to prevent the gas within the gas chamber 94 from leading. The lower sealing member 98 is retained between the second shoulder 50 of the body 40 and the bearing 90. The upper sealing member 96 is disposed adjacent and preferably affixed to the bearing 58 adjacent the piston flange 56 and is slidably displaced downwardly toward the other sealing member 98 as the punch tool 12 is advanced by the ram 14 and the piston 34 is displaced. Thus, the piston 34 is slidably received through the lower sealing member 98 which is generally stationary relative to the body 40. Conversely, the upper sealing member 96 is slidably received in the first counterbore 44 of the body 40 for co-reciprocation with the piston 34 with little or no relative movement between the seal 96 and the piston 34. Thus, as the punch tool is advanced the upper seal 96 is displaced toward the lower seal 98 decreasing the volume of the gas chamber 94 and increasing the pressure therein. This construction permits an extremely compact gas spring design. A pressure relief screw 100 received through the hole 54 in the body 40 can be manipulated to release some or all of the gas in the gas chamber 94 to control the pressure of the gas.

Figure 4:
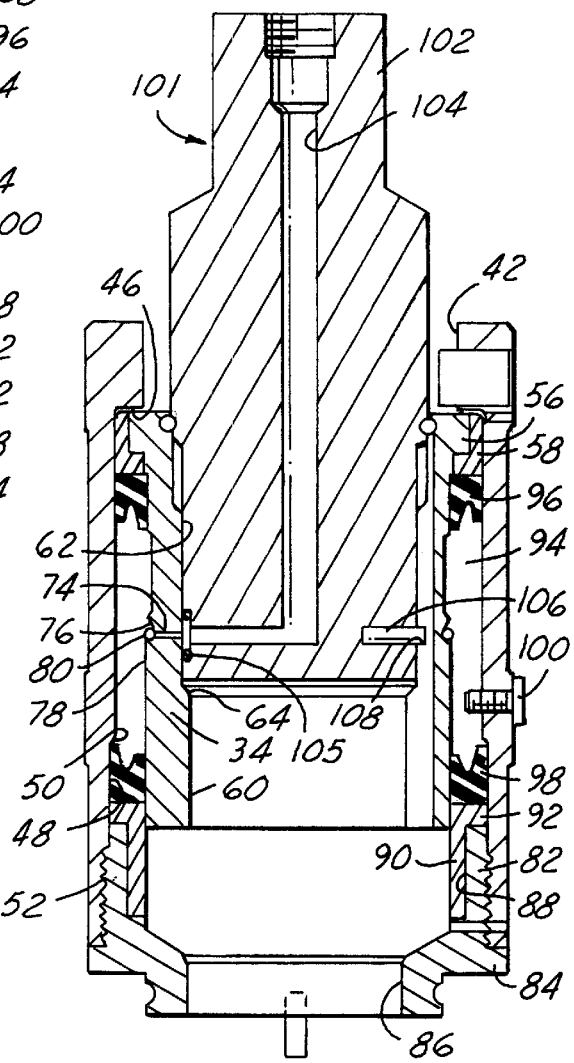
FIG. 4 is a cross sectional view of a filler mandrel for charging the gas spring.

FIG. 4 illustrates a gas filler adapter 101 with a body 102 received within the piston 34 and having an L-shaped passage 104 communicating at one end with the gas fill passage 74 of the piston and at its other end with a compressed gas source. An O-ring 105 provides a seal between the two passages 74 and 104. The O-ring 80 adjacent the gas fill passage 74 acts as a check valve to permit gas to enter the gas chamber 94 from the passage 104 of the filler body 102 but prevents the reverse flow of gas from the gas chamber 94 into the gas fill passage 74. A dowel 106 in the adapter 101 is slidably received in a groove 108 in the piston 34 to align the passage 104 in the body 102 of the adapter 101 with the gas fill passage 74 in the piston 34.

Operation

In operation, the ram 14 of the press bears on and advances the punch tool 12 against the pressure of the gas in the gas chamber 94 to form the workpiece 16. The advancement of the punch tool 12 drives the piston 34 downward thereby reducing the volume of the gas chamber 94 and thus, increasing the pressure of the gas therein. After forming the workpiece 16, the ram 14 is retracted and the force of the gas in the gas chamber 94 acts on the piston 34 through the upper sealing member 96 to retract the piston 34 and the punch tool 12 to their initial positions whereupon the cycle may be repeated to form subsequent workpieces 16.

The sleeve-type gas spring 10 replaces mechanically actuated punch assemblies to provide a punch assembly which has a retracting force which can be readily varied as a function of the pressure of the gas within the chamber 94 and which is reliable and in service has a long useful life. A significant force can be supplied by the gas spring 10 in a relatively compact package to quickly retract the punch tool 12 and thereby increase the performance of the press 20 since the gas pressure can be up to about 2,000 psi when the piston is retracted. Further, to replace either of the annular sealing members 96, 98 as they become worn in use, the punch tool guide 82 can be quickly unscrewed from the body 40 and the sealing members 96, 98 easily replaced to reduce the down time of the punch press 20 and to increase the service life of the sleeve-type gas spring 10 in use.

What is claimed is:

1. In combination, a gas spring and a work tool, the gas spring comprising:
    a body having a generally cylindrical bore formed therethrough;
    a piston comprising an annular sleeve slidably received for reciprocation within the bore of the body between first and second positions and having generally opposed ends and a bore through the sleeve, the sleeve having a shoulder in the bore, and the sleeve being constructed and arranged to removably receive the work tool therein and carry the work tool;
    the work tool having a shank which extends axially through the sleeve, has opposed ends each axially spaced beyond an adjacent end of the sleeve and the body, bears on the shoulder in the sleeve, and is received in the sleeve for co-reciprocation in unison with the sleeve; and
    an annular gas chamber encircling the sleeve and the work tool when received therein and defined at least in part between the sleeve and the body and constructed to contain a gas under pressure whereby a force applied to the work tool displaces the sleeve towards its second position thereby decreasing the volume of the gas chamber and increasing the pressure of the gas within the gas chamber so that when the force applied to the work tool tending to displace the sleeve towards its second position is reduced or no longer applied to the work tool, the gas in the gas chamber acts on the sleeve to displace the sleeve towards its first position and move the work tool therewith.

2. The combination of claim 1 wherein one end of the work tool extends outwardly of the body so that said end of the work tool may be engaged by an actuator to advance the work tool from a retracted position of the work tool and the sleeve is displaced with the work tool, and when the force exerted by the gas in the gas chamber acting on the sleeve is greater than the force of the actuator tending to advance the work tool, the gas in the gas chamber acting on the sleeve returns the work tool and sleeve to their respective retracted positions.

3. The combination of claim 1 wherein the sleeve has a radially extending flange adjacent one end and the body has a counterbore providing a shoulder engageable by the flange of the sleeve to limit the movement of the sleeve.

4. The combination of claim 3 which also comprises at least one bearing disposed between the sleeve and the body and constructed to guide the sleeve as it reciprocates.

5. The combination of claim 4 wherein the bearing is carried by the sleeve and surrounds the flange of the sleeve.

6. The combination of claim 4 wherein a second bearing is disposed adjacent the other end of the sleeve to guide the sleeve as it reciprocates.

7. The combination of claim 6 wherein the second bearing is carried by the body.

8. The combination of claim 4 wherein each bearing is disposed outside of the gas chamber.

9. The combination of claim 1 which also comprises a pair of spaced apart, annular sealing members which, in combination with the sleeve and the body, define the gas chamber between them.

10. The combination of claim 9 wherein one of the sealing members is carried by the sleeve and reciprocates therewith.

11. The combination of claim 10 wherein the other sealing member is generally stationary with the sleeve slidably received therethrough and movement of the sleeve and said sealing member carried by the sleeve changes the volume of the gas chamber.

12. The combination of claim 1 wherein the body has an end cap removably connected thereto to facilitate assembly and disassembly of the gas spring.

13. The combination of claim 1 wherein the gas in the gas chamber is nitrogen.

14. A gas spring for a work tool having a shank and generally opposed ends, the gas spring comprising:

a body having a generally cylindrical bore formed therethrough;

a piston comprising an annular sleeve slidably received for reciprocation within the bore between first and second positions and having generally opposed ends and a bore through the sleeve, the sleeve being constructed and arranged to removably receive a shank of a work tool therein which extends axially through the sleeve and has opposed ends each axially spaced beyond an adjacent end of the sleeve, and the sleeve is constructed and arranged to carry the work tool for reciprocation in unison with the sleeve; and an annular gas chamber encircling the sleeve and the work tool when received therein and defined at least in part between the sleeve and the body and constructed to contain a gas under pressure whereby a force applied to the work tool displaces the sleeve towards its second position thereby decreasing the volume of the gas chamber and increasing the pressure of the gas within the gas chamber so that when the force applied to the work tool tending to displace the sleeve towards its second position is reduced or no longer applied to the work tool, the gas in the gas chamber acts on the sleeve to displace the sleeve towards its first position and move the work tool therewith, the sleeve having a gas fill passage formed therethrough and communicating with the gas chamber to admit gas into the gas chamber, and a check valve adjacent the gas fill passage which opens to permit gas to enter the gas chamber and closes to prevent reverse flow of gas from the gas chamber through the gas fill passage.

15. The gas spring of claim 14 wherein the check valve is an O-ring received around the sleeve adjacent the fill passage, the O-ring is expanded slightly by the pressurized gas in the gas fill passage to allow gas to flow into the gas chamber.

16. A gas spring for a work tool having a shank and generally opposed ends, the gas spring comprising:

a body having a generally cylindrical bore formed therethrough;

a piston comprising an annular sleeve slidably received within the bore of the body for reciprocation between first and second positions and having generally opposed ends and a bore through the sleeve to removably receive a shank of a work tool therein which extends axially through the sleeve and has opposed ends each axially spaced beyond an adjacent end of the sleeve and the body;

an abutment on the sleeve to bear on the work tool when received in the sleeve for reciprocation of the sleeve in unison with the tool when received in the sleeve;

an annular gas chamber encircling the sleeve and the work tool when received therein and defined at least in part between the sleeve and the body to contain a gas under pressure whereby force applied to the work tool received in the sleeve displaces the sleeve toward its second position in unison with the tool thereby decreasing the volume of the gas chamber and increasing the pressure of the gas within the gas chamber so that when the force applied to the work tool received in the sleeve tending to displace the sleeve toward its second position is reduced or no longer applied to the work tool in the sleeve, the gas in the gas chamber acts on the sleeve to displace the sleeve toward its first position and move the work tool received in the sleeve therewith;

a first bearing disposed between the sleeve and the body and adjacent one end of the sleeve to guide the sleeve as it reciprocates, a second bearing spaced from the first bearing, disposed between the sleeve and the body adjacent the other end of the sleeve at least when the sleeve is in its first position and constructed to guide the sleeve as it reciprocates, and a pair of spaced-apart annular sealing members which in cooperation with the sleeve and the body define the gas chamber, and each one of the sealing members being disposed between the bearings and adjacent one of the bearings so that both the first and second bearings are outside of the gas chamber, wherein one of the sealing members is carried by the sleeve and reciprocates therewith such that the movement of the one sealing member toward the other sealing member causes the volume of the gas chamber to decrease thus increasing the pressure of the gas within the gas chamber.

17. The gas spring of claim 16 in combination with a work tool received in the bore of the sleeve and engaged with the abutment for co-reciprocation with the sleeve.

18. A gas spring for a work tool having a shank and generally opposed ends, the gas spring comprising:

a body having a generally cylindrical bore formed therethrough;

a piston comprising an annular sleeve slidably received within the bore of the body for reciprocation between first and second positions and having generally opposed ends and a bore through the sleeve to removably receive a shank of a work tool therein which extends axially through the sleeve and has opposed ends each axially spaced beyond an adjacent end of the sleeve and the body;

an abutment on the sleeve to bear on the work tool when received in the sleeve for reciprocation of the sleeve in unison with the tool when received in the sleeve;

an annular gas chamber encircling the sleeve and the work tool when received therein and defined at least in part between the sleeve and the body to contain a gas under pressure whereby force applied to the work tool received in the sleeve displaces the sleeve toward its second position in unison with the tool thereby decreasing the volume of the gas chamber and increasing the pressure of the gas within the gas chamber so that when the force applied to the work tool received in the sleeve tending to displace the sleeve toward its second position is reduced or no longer applied to the work tool in the sleeve, the gas in the gas chamber acts on the sleeve to displace the sleeve toward its first position and move the work tool received in the sleeve therewith; and a gas fill passage through the sleeve which communicates with the gas chamber to admit gas into the gas chamber and a check valve communicating with the gas fill passage which opens to permit pressurized gas to enter the gas chamber and closes to prevent reverse flow of gas from the gas chamber through the gas fill passage.

* * * * *